United States Patent [19]

Lawhorne

[11] Patent Number: 4,536,268

[45] Date of Patent: Aug. 20, 1985

[54] PROCESS FOR THE REDUCTION OF THE VISCOSITY OF HIGH SOLIDS PIGMENT SLURRIES

[75] Inventor: Earl R. Lawhorne, Savannah, Ga.

[73] Assignee: American Cyanamid Company, Stamford, Conn.

[21] Appl. No.: 588,264

[22] Filed: Mar. 12, 1984

[51] Int. Cl.³ .............................................. B01D 57/02
[52] U.S. Cl. .................................................. 204/182.4
[58] Field of Search ............................ 204/180 P, 301

[56] References Cited

U.S. PATENT DOCUMENTS 3,671,412  6/1972  Lohr ................................. 204/180 P
3,738,925  6/1973  Cooke .............................. 204/180 P

FOREIGN PATENT DOCUMENTS 45-31075  7/1970  Japan ............................. 204/180 P

*Primary Examiner*—Andrew H. Metz
*Assistant Examiner*—Terryence Chapman
*Attorney, Agent, or Firm*—Frank M. Van Riet

[57] ABSTRACT

A process for the reduction of the viscosity of high solids pigment slurries is disclosed whereby the slurries are subjected to electrodialysis utilizing an ammonium salt or dilute acid solution as the anolyte.

4 Claims, No Drawings

PROCESS FOR THE REDUCTION OF THE VISCOSITY OF HIGH SOLIDS PIGMENT SLURRIES

BACKGROUND OF THE INVENTION

There exist commercially today, basically two processes for the manufacture of titanium dioxide pigment. The first is the chlorination process whereby titanium ore is reacted with a carbon source and chlorine to form titanium tetrachloride which, in turn, is oxidized to form the titanium dioxide and recyclable chlorine. The second process is the sulfuric acid process whereby titanium ore is digested with sulfuric acid to form a cake containing the sulfate salts of the iron, titanium and other metals contained in the ore. Impurities are then removed and the acid content is adjusted to that desired. The digestion liquor is then hydrolyzed to form hydrous titanium dioxide which, upon calcination, converts to either anhydrous anatase or rutile titanium dioxide pigment.

A large and still increasing proportion of all titanium dioxide pigment used in paper and paint manufacture is marketed and used in a slurry form. Because of the high cost of transportation, it is becoming increasingly important to ship said slurries at their highest practical solids concentration. However, the requirements for commercial slurries are that the slurry viscosity be low enough for pumping and not change appreciably upon aging. Although slurry viscosity may be controlled somewhat by proper dispersant addition, the presence of sulfate ions chemically bound to the $TiO_2$ in te slurry has a tendency to cause flocculation and thereby increase the viscosity of the slurry. If a method could be found which would prevent or minimize the tendency of such slurries to increase in viscosity over their lifetimes, such method would satisfy long-felt need in the industry.

It has now been found that the viscosity of high solids pigment slurries can be reduced by subjecting the slurry to electrodialysis. The use of electrodialysis obviates the necessity for the lengthy and expensive reprocessing which accompanies many alternative viscosity reducing procedures contemplated or used commercially. The reduction of the viscosity of high solids pigment slurries in accordance with the present invention enables the manufacturer to produce and ship higher solids content slurries having substantially stable viscosities equivalent to or lower than previous commercial slurries at an ultimate economic advantage.

DESCRIPTION OF THE INVENTION INCLUDING PREFERRED EMBODIMENTS

This invention relates to a process for the reduction of the viscosity of high solids content, aqueous pigment slurries which comprises:
 (a) placing a high solids content, aqueous pigment slurry into a cathode compartment separated from an anode compartment by a low porosity permeable membrane,
 (b) placing an ammonium salt or dilute acid anolyte solution in said anode compartment,
 (c) passing electric current through said cathode and anode compartments and
 (d) recovering the resultant pigment slurry.

A typical titanium dioxide slurry which exhibits the tendency to increase in viscosity on aging comprises a slurry containing undercalcined $TiO_2$ from the sulfate process and contains from about 60% to about 85%, preferably from about 70% to about 80%, $TiO_2$ solids and, correspondingly, from about 15% to about 40%, preferably from about 20% to about 30%, of liquid which is primarily water. The pH of such slurries will generally be adjusted to about 9-10 to produce the most desirable viscosity for commercial use. The high solids slurries processed according to the instant process may be prepared from either untreated, dry milled titanium dioxide or by wet milling after the titanium dioxide has been incorporated into slurry form. The subjection of these slurries in accordance with the present invention to electrodialysis reduces the viscosity of the slurries and improves their processing rates through mills, screens etc.

Although the above description has been directed principally to titanium dioxide slurries, the instant process can be applied to any inert pigment slurry which is normally handled i.e. sold and used commercially, in an aqueous slurry form.

The electrodialysis treatment described above has been set forth with regard to the use of a two compartment system, however, a three compartment dialysis unit could also be employed wherein the center compartment is separated from two outer compartments by suitable membranes. A tightly woven, heavy fabric filter cloth membrane has been found to be satisfactory for this purpose. The pigment slurry to be dialyzed is placed in the central compartment and a suitable electrolyte (usually in tap water or distilled water) is placed in the two outer compartments. The cathode is placed in one outer compartment and the anode is placed in the other.

Another variation of electrodialysis using a three compartment unit comprises the use of a single center cathode compartment and two outer anode compartments which are electrically connected in parallel.

The membranes useful herein may be constructed of any material known to be useful for this purpose such as filter cloth, ceramic, leather etc. while the electrolyte (anolyte) may be any ammonium salt solution or any very dilute acid solution. Sulfuric acid solutions are preferred. When a DC current is applied to the system, anions migrate from the slurry into the electrolyte solution and cations migrate from the electrolyte into the slurry. The slurry pH is thereby raised and the viscosity is reduced. Care must be taken to prevent the excessive migration of cations into the slurry in order to prevent flocculation and viscosity increase. The presence of $Na^+$ and $K^+$ cations in the slurry cause undesirable flocculation, however the $NH_4^+$ cation has been found to be acceptable. The electrodes may be constructed of any relatively inert material which is not easily corroded by the slurry and does not contribute excessive, unwanted contamination of the slurry. Examples of suitable materials which may be used include antimony-lead; stainless steel; titanium, etc.

The following examples are set forth for purposes of illustration only and are not to be construed as limitations on the present invention except as set forth in the appended claims. All parts and percentages are by weight unless otherwise specified.

EXAMPLE A (Comparative)

A slurry containing undercalcined $TiO_2$ is placed in a cathode compartment made of Dacron filter cloth having very low porosity of about 0.5 cfm air/ft.$^2$. A surrounding anode compartment is filled with a solution containing 50 g/l NaOH. Electrodes are made of lead containing 1% antimony. DC current from two 1.5 V dry cells, connected in series, is passed through the system for about 1.25 hours. The pH of the 73.3% solids slurry in the cathode compartment increases from 9.4 to 10.35. The viscosity, however, is increased from the original value because of the added Na$^+$ ions. This example shows that although the pH of the slurry is increased, because of the use of a sodium electrolyte, the viscosity thereof also increased.

EXAMPLE I

A slurry is prepared from undercalcined anatase $TiO_2$. This slurry is visibly flocculated even at 37% solids content. The $TiO_2$ slurry is placed in a cathode compartment of a dialysis device and a solution of 50 g/l $NH_4Cl$ is placed in the anode compartment. DC current from two 1.50 batteries is passed through system for 30 minutes. The results are as set forth below:

|  | INITIAL SLURRY | AFTER ELECTRO DIALYSIS |
| --- | --- | --- |
| pH | 5.2 | 7.7 |
| Brookfield Viscosity |  |  |
| RV-4 @ 10 rpm | 11400 cps | 4150 |
| 50 rpm | 2760 | 1050 |
| 100 rpm | 1520 | 565 |

EXAMPLE II

A portion of the same $TiO_2$ slurry used in Example A is placed in the cathode compartment and the anode compartment is filled with a solution containing a mixture of 50 g/l $(NH_4)_2SO_4$ and a small amount of $NH_4OH$. A DC current from a 6 V dry dry cell is passed for about one hour. Slurry pH increases from 9.4 up to 10.2 and slurry Brookfield viscosity measured with RV-4 spindle at 50 rpm decreases from 2460 to 2120 cps.

EXAMPLE III

A portion of the same slurry used for Example A is placed in the cathode compartment of a dialysis system. A solution containing 10 g/l of sulfuric acid is added to the anode compartment. DC current (12 V from two 6 V batteries in series) is passed through the system for 15 minutes. Results are as follows:

|  | INITIAL SLURRY | AFTER ELECTRO DIALYSIS |
| --- | --- | --- |
| pH | 9.4 | 9.9 |
| Brookfield Viscosity |  |  |
| RV-4 @ 10 rpm | 9800 cps | 6600 cps |
| 50 rpm | 2460 | 1650 |
| 100 rpm | 1420 | 960 |

EXAMPLE IV

Sulfate process calciner discharge $TiO_2$ is collected during a production period when mechanical problems caused erratic heating and undercalcined product. The micropulverized $TiO_2$ powder is slurried in water until the viscosity of the resulting slurry reaches the point at which the slurry becomes difficult to handle. This slurry is then subjected to electrodialysis by placing the slurry in a center cathode compartment with an anode compartment on each side thereof. The anode compartments are filled with a very dilute solution of ammonium hydroxide and are connected electrically parallel to the positive junction of an 18 Volt DC power supply. The cathode, which is immersed in the slurry, is connected to the negative function of the power supply. Results of the electrodialysis are as set forth in Table I, below.

TABLE I

| Time | % Solids in Slurry | Slurry pH | Brookfield Viscosity | |
| --- | --- | --- | --- | --- |
|  |  |  | 10 RPM Spindle Speed | 50 RPM Spindle Speed |
| 0 | 41.52 | 2.5 | 13,300 Centipoises | 3020 Centipoises |
| 7.5 hrs. | 38.4 | 6.8 | 12,900 Centipoises | 2960 Centipoises |
| 12 hrs. | 35.66 | 9.2 | 2090 Centipoises | 535 Centipoises |

EXAMPLE B (Comparative)

Another slurry is prepared from a similar $TiO_2$ calciner discharge as described in Example IV and the Brookfield Viscosity is determined on the non-dialyzed slurry to show the effect of solids concentration. The results are set forth in Table II, below.

TABLE II

| % Solids in Slurry | Slurry pH | Brookfield Viscosity | |
| --- | --- | --- | --- |
|  |  | 10 RPM Spindle Speed | 50 RPM Spindle Speed |
| 41.28 | 2.1 | 13,500 Centipoises | 3180 Centipoises |
| 40.04 | 2.1 | 11,700 Centipoises | 2700 Centipoises |
| 38.87 | 2.1 | 10,100 Centipoises | 2360 Centipoises |
| 37.77 | 2.1 | 8,600 Centipoises | 2080 Centipoises |
| 36.73 | 2.1 | 7,400 Centipoises | 1720 Centipoises |
| 34.74 | 2.1 | 5,700 Centipoises | 1480 Centipoises |
| 34.74 | pH to 9.3 | 3,000 Centipoises | 720 Centipoises |

This example shows that the viscosity of a $TiO_2$ slurry cannot be reduced as effectively by reducing the slurry solids concentration as can be achieved by the electrodialysis procedure of the present invention, compare Example IV.

EXAMPLE C (Comparative)

A second portion of the same slurry as used in Example B is used to measure the effect of pH adjustment upon slurry viscosity. After initial pH, viscosity and % solids are measured, approximately 4 to 5 drops of ammonium hydroxide are added and thoroughly mixed into the slurry. pH and viscosity are then measured. This process is repeated until a final pH of 9.6 is attained. A final solids concentration is determined to show the minimal effect of adding liquid ammonium hydroxide. Results are shown below in Table III.

TABLE III

| % Solids | Slurry pH | Brookfield Viscosity | |
| --- | --- | --- | --- |
|  |  | 10 RPM Spindle Speed | 50 RPM Spindle Speed |
| 41.28 | 2.1 | 13,500 Centipoises | 3180 Centipoises |
|  | 2.8 | 14,600 Centipoises | 3420 Centipoises |
|  | 3.5 | 15,400 Centipoises | 3560 Centipoises |
|  | 4.9 | 19,000 Centipoises | 4000 Centipoises |
|  | 6.3 | 17,000 Centipoises | 4000 Centipoises |
|  | 7.5 | 18,600 Centipoises | 4000 Centipoises |
|  | 8.25 | 16,100 Centipoises | 3800 Centipoises |

TABLE III-continued

| % Solids | Slurry pH | Brookfield Viscosity | |
|---|---|---|---|
| | | 10 RPM Spindle Speed | 50 RPM Spindle Speed |
| | 8.8 | 13,600 Centipoises | 3160 Centipoises |
| | 9.2 | 11,100 Centipoises | 2620 Centipoises |
| 41.08 | 9.6 | 8,400 Centipoises | 1980 Centipoises |

Example C again shows that the viscosity of $TiO_2$ slurries cannot be reduced as effectively as when utilizing the process of the present invention (see Example IV) when the reducing means comprises pH adjustment.

We claim:

1. A method for reducing the viscosity of an aqueous pigment slurry which comprises (a) placing a high solids content $TiO_2$ pigment slurry into a cathode compartment separated from an anode compartment by a low porosity permeable membrane,
   (b) placing an ammonium or dilute acid anolyte solution in said anode compartment,
   (c) passing electric current through said cathode and anode compartments and
   (d) recovering the resultant pigment slurry, whereby said slurry is of a reduced viscosity.

2. A method according to claim 1 wherein said anolyte is an ammonium salt solution.

3. A method according to claim 1 wherein said anolyte is a dilute acid solution.

4. A method according to claim 1 wherein said slurry is produced from undercalcined $TiO_2$ from the sulfate process.

* * * * *